(No Model.)
A. M. HEWLETT.
PIPE DRAWING TOOL.
No. 537,460. Patented Apr. 16, 1895.
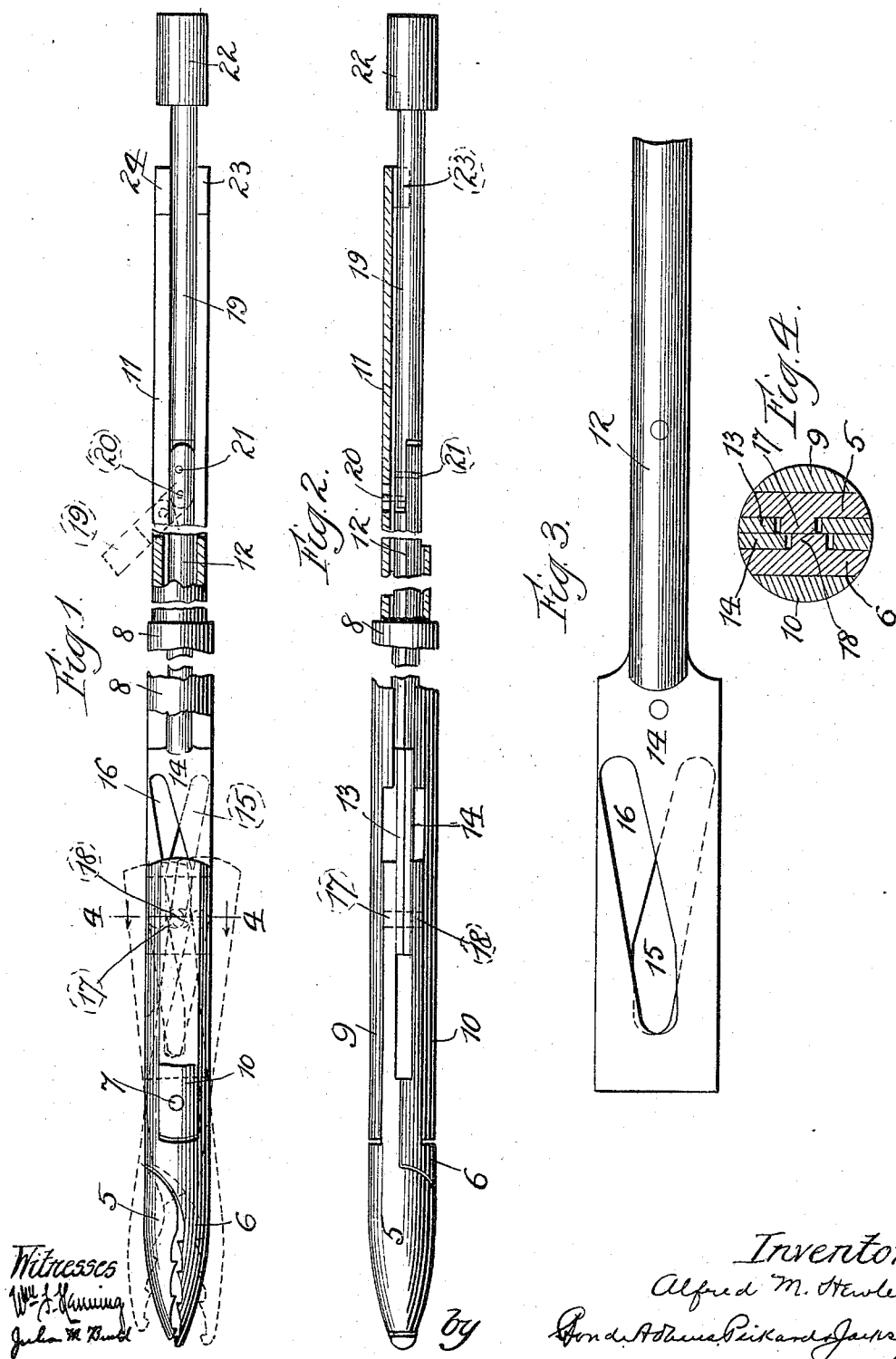
Witnesses
Inventor
Alfred M. Hewlett
Attys

UNITED STATES PATENT OFFICE.

ALFRED M. HEWLETT, OF KEWANEE, ILLINOIS.

PIPE-DRAWING TOOL.

SPECIFICATION forming part of Letters Patent No. 537,460, dated April 16, 1895.

Application filed November 22, 1894. Serial No. 529,671. (No model.)

*To all whom it may concern:*

Be it known that I, ALFRED M. HEWLETT, a citizen of the United States, residing in Kewanee, Henry county, Illinois, have invented certain new and useful Improvements in Pipe-Drawing Tools, of which the following is a specification, reference being had to the accompanying drawings, in which—

Figure 1 is a side elevation, part being broken away. Fig. 2 is a plan view, part being in section. Fig. 3 is an enlarged detail, being a side view of the operating device. Fig. 4 is a cross section on line 4—4 of Fig. 1.

My invention relates to tools for drawing pipe in the manufacture of butt-weld pipe by drawing a skelp through a bell, and has for its object to provide an improved tongs which will be so constructed as to be adapted to pass through a bell and to grip the skelp with a grip sufficiently strong to permit of its being drawn through the bell by means of the tongs. I accomplish this object as hereinafter specified and as illustrated in the drawings.

That which I regard as new will be set forth in the claims.

In the drawings,—5—6 indicate the upper and lower jaws, respectively, of the tongs, which are mounted upon a pivot 7. The pivot 7 is supported by the body 8 of the tongs, which consists of a rear cylindrical portion and a bifurcated forward portion consisting of parallel arms 9—10 arranged at opposite sides of the rear portions of the jaws 5—6, as shown in Fig. 2. The pivot 7 is mounted near the forward ends of the arms 9—10, as shown in Fig. 1.

11 indicates a handle which is connected to the body 8 and extends rearwardly therefrom, as shown in the drawings.

12 indicates a rod which is provided at its forward end with an operating device consisting of parallel plates 13—14 which are secured together and are provided with oppositely inclined slots 15—16, said slots diverging toward their rear ends, as shown in Fig. 3. The plates 13—14 are preferably fixedly secured together, and if desired, instead of using two separate plates 13—14 the operating device may be made of a single plate having inclined slots 15—16 in opposite sides thereof. However, I prefer the form shown, for the reason that it is easier to manufacture it.

The rear end of the upper jaw 5 is provided with an inwardly projecting pin 17, indicated by dotted lines in Fig. 2, which pin projects into the slot 15. Similarly, the rear end of the lower jaw 6 is provided with an inwardly projecting pin 18 which projects into the slot 16. By this construction, when the plates 13—14 are moved forward—that is, toward the jaws—said jaws will be caused to separate, inasmuch as the rear end of the upper jaw will be moved downward and the rear end of the lower jaw will be moved upward, as indicated by dotted lines in Fig. 1. By reversing the movement of the plates 13—14 the jaws may be forcibly closed.

For the purpose of operating the jaws the rod 12 is connected at its rear end to a lever 19, which is pivoted at its forward end by a pivot 20 to the handle 11. The pivot, 21, which connects the rod 12 to the lever 19 is located a short distance back of the pivot 20. By this construction, by operating the lever 19 the jaws 5—6 may be forcibly opened and closed as desired. The handle 11 is provided with a slot to receive the pivot 20, so that a slight longitudinal movement of the lever is permitted in order to permit of the tightening of the grip of the jaws when the lever 19 is attached to the drawing mechanism. A collar 22 is provided at the end of the lever 19, by means of which it may be attached to the drawing mechanism.

23—24 indicate stops carried by the handle 11 in convenient position to lock the lever 19 in line with said handle.

That which I claim as my invention, and desire to secure by Letters Patent, is—

1. The combination with supporting devices, of a pair of gripping jaws pivotally connected together, an operating device having inclined slots, pins carried by said jaws and moving in said slots, and means for reciprocating said operating device, substantially as described.

2. The combination with a body having arms 9—10, and jaws 5—6 pivoted between said arms, of an operating device movable longitudinally in said body, said operating device having oppositely inclined slots, pins carried by said jaws and moving in said slots, and means for moving said operating device longitudinally, substantially as described.

3. The combination with supporting devices, and a pair of gripping jaws pivotally connected together and supported thereby, of an operating device having inclined slots, pins carried by said jaws and moving in said slots, and a lever for longitudinally moving said operating device, substantially as described.

4. In a pair of tongs, the combination with a supporting device, of a pair of gripping jaws pivotally connected together and supported by said device, a slotted operating device, and means for reciprocating said operating device for opening and closing said jaws, substantially as specified.

5. In a pipe tongs, the combination with supporting devices, and a pair of jaws pivotally connected together, of a longitudinally movable operating device having inclined slots, pins carried by said jaws and moving in said slots, and a lever pivotally connected to said supporting devices and to said operating device, said lever being adapted to be turned into a position parallel with the supporting devices and being movable longitudinally thereof, substantially as described.

ALFRED M. HEWLETT.

Witnesses:
CHAS. I. PIERCE,
ELMER S. GOOD.